(12) United States Patent
Zhou et al.

(10) Patent No.: US 11,853,767 B2
(45) Date of Patent: Dec. 26, 2023

(54) INTER-CORE DATA PROCESSING METHOD, SYSTEM ON CHIP AND ELECTRONIC DEVICE

(71) Applicant: GUANGDONG OPPO MOBILE TELECOMMUNICATIONS CORP., LTD., Guangdong (CN)

(72) Inventors: Feng Zhou, Guangdong (CN); Pan Fang, Guangdong (CN); Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 113 days.

(21) Appl. No.: 17/563,439

(22) Filed: Dec. 28, 2021

(65) Prior Publication Data

US 2022/0121451 A1 Apr. 21, 2022

Related U.S. Application Data

(63) Continuation of application No. PCT/CN2020/121908, filed on Oct. 19, 2020.

(30) Foreign Application Priority Data

Oct. 29, 2019 (CN) .......................... 201911038899.5

(51) Int. Cl.
*G06F 9/38* (2018.01)
*G06F 12/084* (2016.01)

(52) U.S. Cl.
CPC .......... *G06F 9/3881* (2013.01); *G06F 9/3836* (2013.01); *G06F 12/084* (2013.01)

(58) Field of Classification Search
CPC .... G06F 9/3881; G06F 9/3836; G06F 12/084; G06F 9/526; G06F 15/167; G06F 15/17; G06F 15/7807; Y02D 10/00
See application file for complete search history.

(56) References Cited

U.S. PATENT DOCUMENTS 5,167,022 A * 11/1992 Bahr ..................... G06F 13/374
710/108
5,778,441 A * 7/1998 Rhodehamel ....... G06F 13/1652
711/151

(Continued)

FOREIGN PATENT DOCUMENTS

CN 102270189 12/2011
CN 102567275 7/2012

(Continued)

OTHER PUBLICATIONS

WIPO, International Search Report and Written Opinion for PCT/CN2020/121908, dated Jan. 22, 2021.

(Continued)

*Primary Examiner* — Farley Abad
(74) *Attorney, Agent, or Firm* — Hodgson Russ LLP (57) ABSTRACT

Disclosed are an inter-core data processing method and system, a system on chip, and an electronic device. The method includes: a first core sends, by means of a command transmission module, to a second core a first command indicating that the first core is ready to perform a data processing operation corresponding to a target address; the second core acquires a mutex corresponding to the target address in response to the first command and returns a second command to the first core by means of the command transmission module; and the first core performs the data processing operation corresponding to the target address by means of a bus module in response to the second command.

20 Claims, 7 Drawing Sheets

(56) References Cited

U.S. PATENT DOCUMENTS

| | | | | |
|---|---|---|---|---|
| 6,029,190 | A | * | 2/2000 | Oliver .................... G06F 9/526 |
| | | | | 718/107 |
| 8,972,995 | B2 | * | 3/2015 | Srinivasan ............. G06F 9/526 |
| | | | | 712/30 |
| 2007/0043916 | A1 | * | 2/2007 | Aguilar ................... G06F 9/526 |
| | | | | 711/E12.039 |
| 2013/0290286 | A1 | | 10/2013 | Su et al. |
| 2015/0286597 | A1 | * | 10/2015 | Vajapeyam ............ G06F 13/28 |
| | | | | 710/308 |
| 2016/0371200 | A1 | * | 12/2016 | Catherwood .......... G06F 13/20 |

FOREIGN PATENT DOCUMENTS

| | | |
|---|---|---|
| CN | 104050066 | 9/2014 |
| CN | 104394096 | 3/2015 |
| CN | 104583900 | 4/2015 |

OTHER PUBLICATIONS

Zhang et al., "Scalable Adaptive NUMA-Aware Lock," IEEE Transactions on Parallel and Distributed Systems, 2017, vol. 28, No. 6.

EPO, Extended European Search Report for EP Application No. 20883486.1, dated Jul. 21, 2022.

\* cited by examiner

INTER-CORE DATA PROCESSING METHOD, SYSTEM ON CHIP AND ELECTRONIC DEVICE

CROSS-REFERENCE TO RELATED APPLICATIONS

The present application is a continuation of International Patent Application No. PCT/CN2020/121908, filed on Oct. 19, 2020, which claims priority to Chinese Patent Application No. 201911038899.5, filed on Oct. 29, 2019, the entire disclosures of which are incorporated herein by reference.

TECHNICAL FIELD

The present disclosure generally relates to electronic technology, and in particular to an inter-core data processing method, a system, a system on chip and an electronic device.

BACKGROUND

To satisfy data processing requirement, electronic devices have been equipped with more processors for data processing than before. Cores of different processors may communicate with each other by means of bus. However, this solution may bring data processing stability problem.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Nowadays, functions of an electronic device are continuously increasing. More and more electronic devices are equipped with multiple processors to process data related to different functions, or with a multi-core processor to process data related to different functions. In one example, application-related data of an electronic device may be processed by a processor while audio data or image data of the electronic device may be processed by another specific processor. In another example, application-related data of an electronic device may be processed by one core of a multi-core processor while audio data or image data of the electronic device may be processed by other core(s) of the multi-core processor.

It can be understood, lots of data of an electronic device are related to each other. In the situation that the electronic device utilizes multiple processors to process data related to different functions, or utilizes a multi-core processor to process data related to different functions, different cores of the multi-core processor or cores of different processors may be required to communicate with each other to achieve data exchange.

When studying related inter-core communication technology, the inventor found that there still exists a certain communication synchronization problem in related inter-core communication processes. In one example, several cores are all capable of performing operations on a same storage area based on spi2apb bus. When a first core is performing data writing operation on address in the corresponding address space of a second core through the spi2apb bus, the second core may also be reading data from the same address, which may cause failure of the data reading operation of the second core. In another example, when a first core is performing data reading from the corresponding address of a second core through the spi2apb bus, the second core may also be writing data on the same address space, which may cause failure of the data reading operation.

Accordingly, to solve the above problem, the inventor of the present disclosure provides an inter-core data processing method, a system, a system on chip (SOC) and an electronic device. According to the present disclosure, a first core and a second core may firstly exchange commands through a command transmission module such that the second core may acquire a mutex lock, then the first and second cores may perform data-related operations through a bus module. When the first core is performing a data-related operation on the target address, the second core would not perform any operation on the same target address. Therefore, data errors may be avoided, and stability of data operations may be improved.

Below is firstly introduced an exemplary working environment related to embodiments of the present disclosure.

Figure 1:
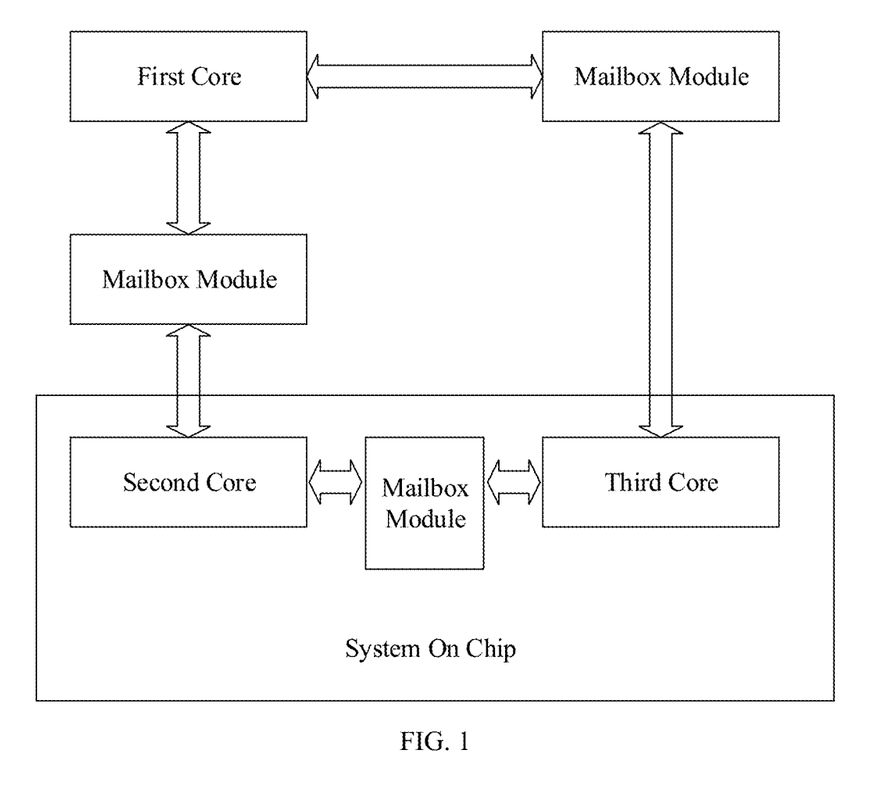
FIG. 1 is an exemplary view illustrating a transmission manner of control commands in an inter-core data processing method according to an embodiment of the present disclosure.

In the working environment as shown in FIG. 1, an electronic device may include a first core, a second core and a third core. The second and third cores may belong to a same system on chip (SOC). In one embodiment, the first core is an application processor and the SOC is a low-consumption SOC. The second core or the third core may be an embedded processor, a specific process (Digital Signal Processor, Image Signal Processor etc.), or a coprocessor. The electronic device may further include multiple command transmission modules. In this case, the first core and the second core may exchange control commands through a corresponding command transmission module, and the second core and the third core may exchange control commands through a corresponding command transmission module. In one exemplary implementation, the command transmission module may be a hardware mailbox module consisting of registers, or hardware queues. Taking the mailbox as example, each command transmission module may include two registers (a first register and a second register). In this implementation, a control command to be transmitted from the first core to the second core may firstly be stored in the first register of a command transmission module which corresponds to both of the first and second cores. Then the second core may read the control command from the first register, and thus the control command is transmitted from the first core to the second core. Correspondingly, a control command to be transmitted from the second core to the first core may firstly be stored in the second register of a command transmission module which corresponds to both of the first and second cores. Then the first core may read the control command from the second register, and thus the control command is transmitted from the second core to the first core.

Figure 2:
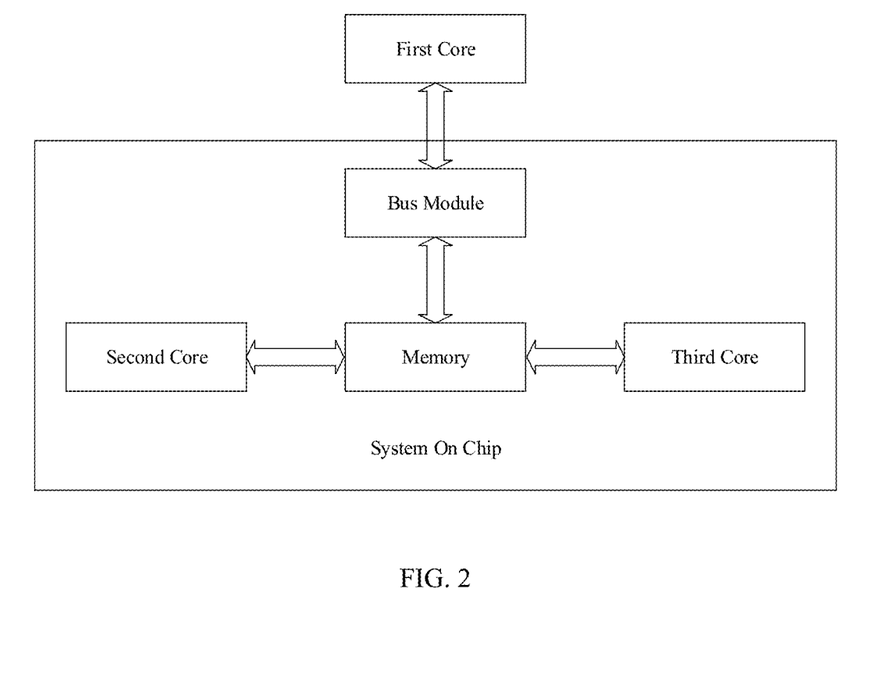
FIG. 2 is a schematic diagram of data transmission channels in an inter-core data processing method according to an embodiment of the present disclosure.

The memory shown in FIG. 2 is a corresponding memory of the SOC, that is, the memory and the second core belong to a same system on chip. The second core and the third core may access the memory through internal communication channels of the SOC to perform data reading or data writing. The first core shown in FIG. 2 does not belong to the SOC, and may access the memory through a bus module to perform data reading or data writing.

It should be understood, embodiments shown in FIGS. 1 and 2 are merely illustrative. In other embodiments of the present disclosure, the first core and the second core may be located in a same SOC, and the amount of cores is not limited to that shown in the figures.

Different embodiments of the present disclosure will be described below with reference to drawings.

Figure 3:
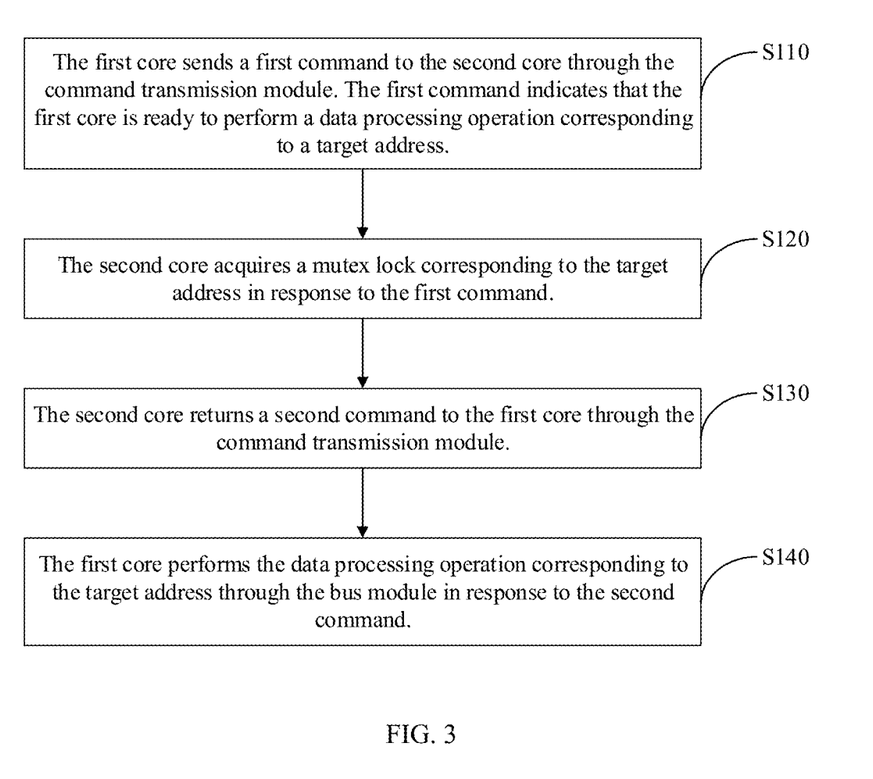
FIG. 3 is a flow chart of an inter-core data processing method according to an embodiment of the present disclosure.

FIG. 3 illustrates an inter-core data processing method according to an embodiment of the present disclosure. The method is configured to be implemented in an electronic device. The electronic device at least includes a first core, a second core, a command transmission module and a bus module. The method includes operations described in following blocks S110 to S140.

S110: The first core sends a first command to the second core through the command transmission module. The first command indicates that the first core is ready to perform a data processing operation corresponding to a target address. The target address is in a memory corresponding to the second core.

It should be understood, tasks of the electronic in operation may be cooperatively accomplished by the first core and the second core. In order to successfully fulfill a task, the first core and the second core may perform data exchange during operation. For example, the electronic device may divide a certain task into a main task and several subtasks, and data processing of the main task may be performed by the first core while data processing of the subtasks may be performed by the second core. Since data generated during processing of the subtasks are stored in the corresponding memory of the second core, the first core needs to perform corresponding data processing operations (i.e., reading data related to the subtasks from the corresponding memory of the second core) to fulfill its task and acquire complete task related data.

In one embodiment, the electronic device is controlled to run an application which requires interface rendering operation. The rendering operation may include rendering of data related to interface frame and rendering of content populated in the interface (e.g., images). In this circumstance, the rendering of data related to interface frame may be determined by the electronic device as a main task, and the first core may be configured to perform this task. The rendering of content populated in the interface may be determined as a subtask, and the second core may be configured to perform this task. Data generated by the second core during rendering of content populated in the interface may be stored in the corresponding memory. Therefore, the first core needs to read data related to content populated in the interface from the corresponding memory of the second core in order to accomplish rendering of the entire interface.

In another embodiment, a currently running application is configured to display videos. It can be understood, video playing may be related to image outputting and audio outputting. In this circumstance, the electronic device may determine the first core to perform image outputting and determine the second core to perform audio outputting. The second core may store audio processing information in its corresponding memory. Therefore, the first core may periodically read data from the corresponding memory of the second core such that audio outputting information may be informed to the application at any necessary time.

It should be noted, in the present embodiment, the corresponding memory of the second core may refer to a memory belonging to the same system on chip as the second core.

S120: The second core acquires a mutex lock corresponding to the target address in response to the first command.

It should be noted, in order to make sure the first core and the second core would not perform data processing operations on the same address at the same time, a mutex lock mechanism is applied in embodiments of the present disclosure. Implementation of mutex lock means data accessing operations are mutually exclusive. In the situation where a same target data address can be accessed by several parts, the part who has acquired the mutex lock will not access the target data access in duration of the mutex lock.

Based on the above description, in one embodiment of the present disclosure, when acquiring the first command transmitted by the first core, the second core may identify that the first core expects to perform a data processing operation on a target address in the corresponding memory of the second core. Accordingly, the second core may acquire a mutex lock corresponding to the target address. In this way, even if the second core also acquires a command for accessing the target address, the second core would not perform the command and access the target address immediately, which may avoid confliction with the data processing operation of the first core.

S130: The second core return a second command to the first core through the command transmission module. The second command is configured to inform the first core to start data processing.

In one embodiment, after having acquired the mutex lock, the second core may send a second command to the first core so as to promptly inform the first core that the second core has acquired the mutex lock and to inform the first core to start data processing.

S140: The first core performs the data processing operation corresponding to the target address through the bus module in response to the second command.

It should be understood, in one embodiment, the second core may be performing a data reading operation on the memory while receiving the first command transmitted by the first core. In this circumstance, if the second core immediately performs the operation of acquiring the mutex lock, the current data reading operation might fail. Therefore, in one embodiment, the second core may be configured to compare a priority level of the data processing operation indicated by the received first command with a priority level of the data reading-writing operation currently performed by the second core. If the priority level of the data processing operation indicated by the first command is higher than the priority level of the data reading-writing operation currently performed by the second core, the second core is configured to immediately acquire the mutex lock corresponding to the target address in response to the first command. If the priority level of the data processing operation indicated by the first command is equal to or lower than the priority level of the data reading-writing operation currently performed by the second core, the second core is configured to, when having received the first command, wait for the end of the current data reading-writing operation and then acquire the mutex lock corresponding to the target address.

In one embodiment, the first command may indicate that the first core is ready to perform data reading on a target address in the corresponding memory of the second core. Reading instructions may correspond to different priority levels whose corresponding timing requirements are different. For example, a reading operation with a higher priority level may indicate a higher timing requirement. It is appreciated that, the timing requirement refers to whether the second core needs to stop its current data reading-writing operation immediately to allow the first core to perform the data reading operation when receiving the first command. For example, the first core may expect to read a certain data in real time, e.g., interface data which need to be displayed to the user in real time. Accordingly, it is expected that the second core may immediately respond to the first command to acquire a mutex lock when the first command indicating the data reading operation is transmitted. As for some other data that are used for storing record, corresponding timing requirement may be relatively lower, and the second core may firstly complete the currently reading-writing operation on the memory and then acquire the mutex lock.

In the present embodiment, different first commands indicating that a first core is ready to perform a data reading operation may respectively correspond to a first reading priority level and a second reading priority level. The first reading priority level is lower than the second reading priority level, that is to say, the timing requirement of the first reading priority level is lower than the timing requirement of the second reading priority level. Correspondingly, different data reading-writing operations of the second core may respectively correspond to a first reading-writing priority level and a second reading-writing priority level, and the first reading-writing priority level is lower than the second reading-writing priority level.

Accordingly, the second core may suspend its current writing operations and acquire the mutex lock corresponding to the target address of the operation of the first command when: the second core, on receiving the first command indicating that the first core is ready to perform a data reading operation, identifies that the priority level of the first command is the second reading priority level; the priority level of the currently performing writing operation of the second core is the first writing priority level; and the second core identifies the first writing priority level is lower than the second reading priority level. In another example, the second core may firstly complete the currently performing writing operation and then acquire the mutex lock corresponding to the target address of the operation of the first command when: the second core identifies the priority level of the first command is the second reading priority level; the second core identifies the priority level of its currently performing writing operation is the second writing priority level; and the second reading priority level is equal to or lower than the second writing priority level.

The present disclosure provides an inter-core data processing method. With a command transmission module and a bus module, a first core may, when ready to perform a data processing operation corresponding to a target address, firstly send a first command to a second core. When receiving the first command, the second core may acquire a mutex lock corresponding to the target address in response to the first command, wherein the second core does not perform any operation on the target address in the duration of the mutex lock. Then the second core may return a second command to the first core through the command transmission module, and the second command is configured to inform the first core to start data processing. The first core may perform the corresponding data processing operation on the target address through the bus module in response to the second command According to the present disclosure, firstly the first core and the second core may exchange commands through the command transmission module such that the second core may acquire the mutex lock, and then the data exchange operation may be performed through the bus module. Therefore, when the first core is performing the data processing operation on the target address, the second core will not perform any operation to the same target address. The implementation of the present disclosure may avoid data errors and thus improve the stability of data operations.

Figure 4:
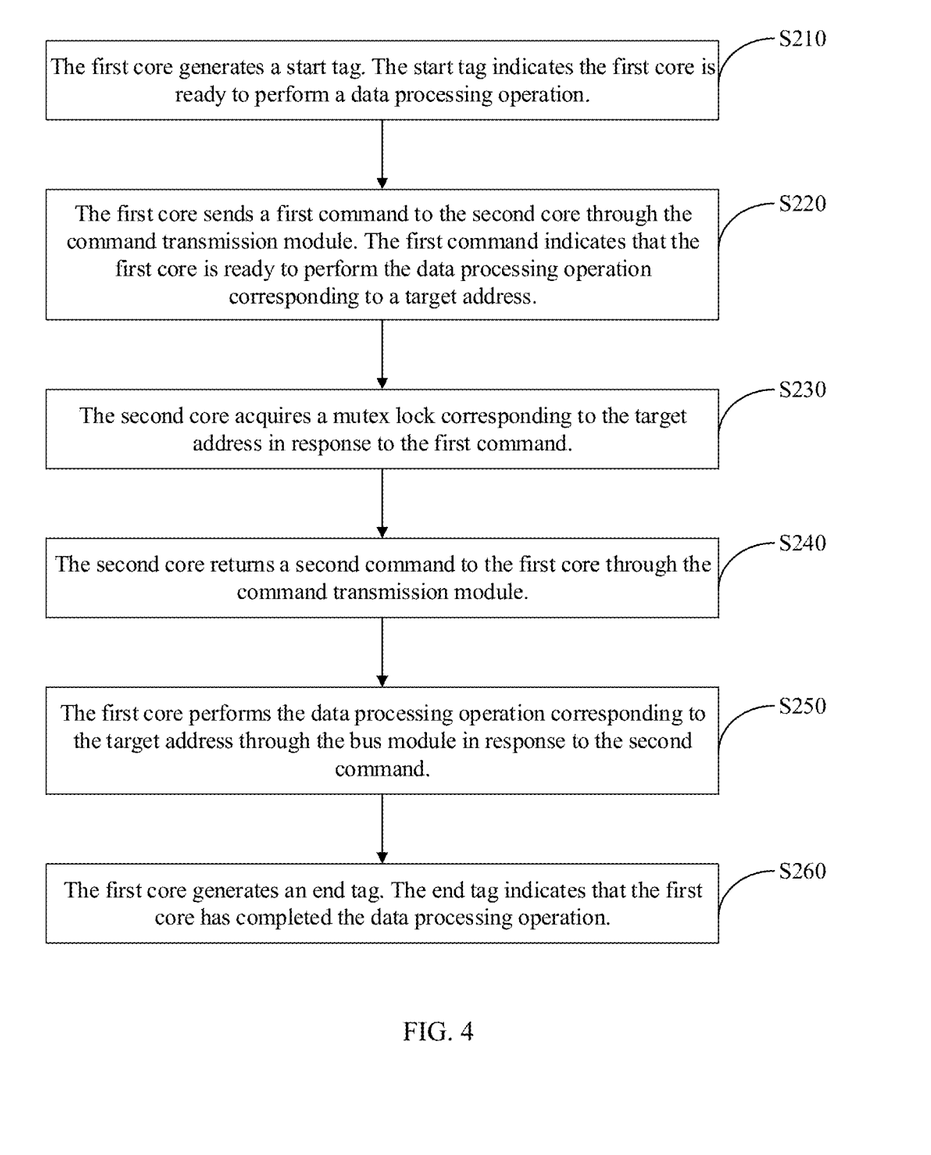
FIG. 4 is a flow chart of an inter-core data processing method according to another embodiment of the present disclosure.

FIG. 4 illustrates an inter-core data processing method according to an embodiment of the present disclosure. The method is configured to be implemented in an electronic device. The electronic device at least includes a first core, a second core, a command transmission module and a bus module. The method includes operations described in following blocks S210 to S260.

S210: The first core generates a start tag. The start tag indicates the first core is ready to perform a data processing operation.

It should be noted, the start tag is configured for the first core to identify that the first core itself is communicating with the second core so as to perform data processing operations.

In one embodiment, the first core may receive multiple commands during operation, and different commands may trigger the first core to perform different data processing operations. For example, one command may inform the first core to communicate with the third core, and another command may inform the first core to communicate with the second core. However, in another example, different commands may trigger the first core to perform the same operation such as informing the first core to communicate with the second core so as to read data from a corresponding memory of the second core. When the start tag is employed, the first core may firstly identify whether a start tag corresponding to the second core already exists when receiving a command triggering the first core to communicate with the second core. If yes, it indicates that communication with the second core is being performed, and the first core may wait for the end of currently performing communication to perform the next communication.

S220: The first core sends a first command to the second core through the command transmission module. The first command indicates that the first core is ready to perform the data processing operation corresponding to a target address, and the target address is located in a corresponding memory of the second core.

S230: The second core acquires a mutex lock corresponding to the target address in response to the first command.

S240: The second core returns a second command to the first core through the command transmission module. The second command is configured to inform the first core to start the data processing operation.

S250: The first core performs the data processing operation corresponding to the target address through the bus module in response to the second command.

S260: The first core generates an end tag. The end tag indicates that the first core has completed the data processing operation.

It should be noted, the end tag is configured for the first core to identify that the first core itself has completed the current data processing operation with regard to the second core, such that the first core may promptly respond to a next command with regard to the second core.

The present disclosure provides an inter-core data processing method. According to the present disclosure, firstly the first core and the second core may exchange commands through the command transmission module such that the second core may acquire the mutex lock, and then the data exchange operation may be performed through the bus module. Therefore, when the first core is performing the data processing operation on the target address, the second core will not perform any operation to the same target address. The implementation of the present disclosure may avoid data errors and thus improve the stability of data operations. Furthermore, the start tag and the end tag are introduced in the present embodiment, which may further help the first core avoid mistakes during data processing operations.

Figure 5:
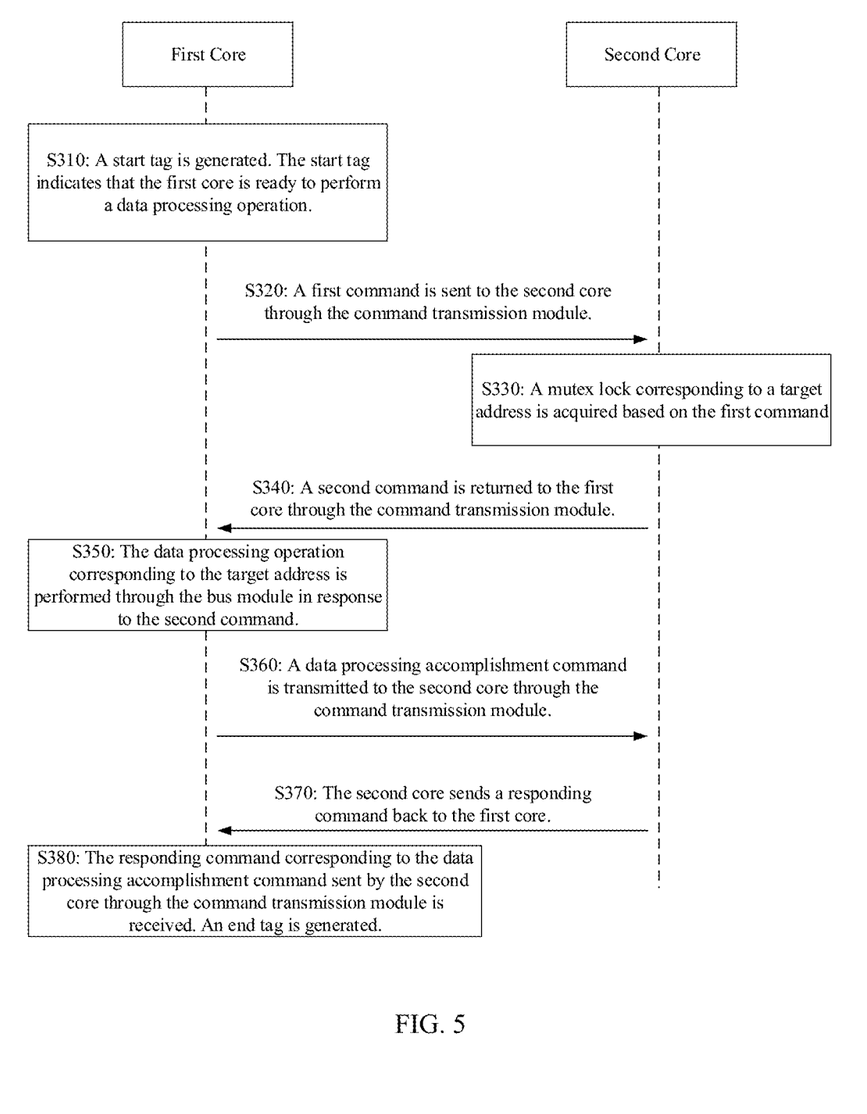
FIG. 5 is a flow chart of an inter-core data processing method according to yet another embodiment of the present disclosure.

FIG. 5 illustrates an inter-core data processing method according to an embodiment of the present disclosure. The method is configured to be implemented in an electronic device. The electronic device at least includes a first core, a second core, a command transmission module and a bus module. The method includes operations described in following blocks S310 to S380.

S310: The first core generates a start tag. The start tag indicates that the first core is ready to perform a data processing operation.

S320: The first core transmit a first command to the second core through the command transmission module. The first command indicates that the first core is ready to perform a data processing operation corresponding to a target address. The target address is located in a corresponding memory of the second core.

S330: The second core acquires a mutex lock corresponding to the target address in response to the first command.

S340: The second core returns a second command to the first core through the command transmission module. The second command is configured to inform the first core to start the data processing operation.

S350: The first core performs the data processing operation corresponding to the target address through the bus module in response to the second command.

S360: The first core transmits a data processing accomplishment command to the second core through the command transmission module.

S370: The second core transmit a responding command back to the first core.

S380: The first core generates an end tag when receiving the responding command corresponding to the data processing accomplishment command from the second core through the command transmission module.

In one embodiment, the data processing operation may include a data reading operation. Before the first core transmit a data processing accomplishment command to the second core through the command transmission module, the first core may verify the read data. If the read data pass verification, the first core accordingly sends the data processing accomplishment command to the second core. It can be understood, data verification of the present disclosure may further improve the integrity of data.

In another embodiment, the data processing operation may include a data writing operation. Before the first core generates the end tag, the second core may verify the written data. If the written data pass verification, the second core accordingly sends the responding command corresponding to the data processing accomplishment command to the first core through the command transmission module.

The present disclosure provides an inter-core data processing method. According to the present disclosure, firstly the first core and the second core may exchange commands through the command transmission module such that the second core may acquire the mutex lock, and then the data exchange operation may be performed through the bus module. Therefore, when the first core is performing the data processing operation on the target address, the second core will not perform any operation to the same target address. The implementation of the present disclosure may avoid data errors and thus improve the stability of data operations.

Figure 6:
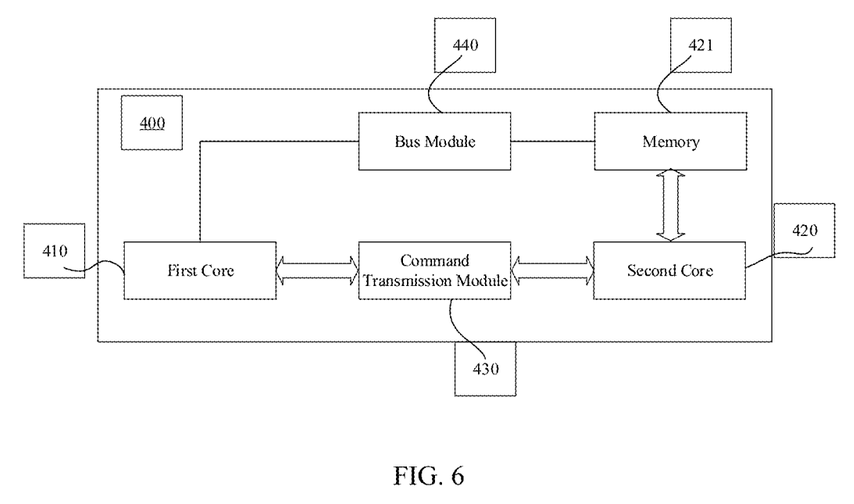
FIG. 6 shows a schematic structure of a system on chip according to an embodiment of the present disclosure.

FIG. 6 illustrates an inter-core data processing system 400 according to an embodiment of the present disclosure. The system at least includes a first core 410, a second core 420, a command transmission module 430, a bus module 440 and a corresponding memory 421 of the second core 420.

The first core 410 is configured to send a first command to the second core 420 through the command transmission module 430, wherein the first command indicates that the first core 410 is ready to perform a data processing operation corresponding to a target address, wherein the target address is located in a corresponding memory 421 of the second core 420.

The second core 420 is configured to acquire a mutex lock corresponding to the target address in response to the first command, and to return a second command to the first core 410 through the command transmission module 430.

The first core 410 is configured to perform the data processing operation corresponding to the target address through the bus module 440 in response to the second command.

In one embodiment, the first core 410 is further configured to, before sending the first command to the second core 420 through the command transmission module 430, generate a start tag which indicates that the first core 410 is ready to perform the data processing operation. The first core 410 is further configured to, after performing the data processing operation corresponding to the target address through the bus module 440 in response to the second command, generate an end tag which indicates that the first core 410 has completed the data processing operation.

In one embodiment, the first core 410 is further configured to, before generating the end tag, send a data processing accomplishment command to the second core 420 through the command transmission module 430. The first core 410 is specifically configured to generate the end tag when receiving a responding command corresponding to the data processing accomplishment command which is sent by the second core 420 through the command transmission module 430.

In one embodiment, the data processing operation includes a data reading operation. The first core 410 is further configured to, before sending the data processing accomplishment command to the second core 420 through the command transmission module 430, verify read data, and to send the data processing accomplishment command to the second core 420 if the read data pass verification.

In one embodiment, the data processing operation includes a data writing operation. The second core 420 is further configured to, before the first core 410 generating the end tag, verify the written data, and to send the responding command corresponding to the data processing accomplishment command to the first core 410 through the command transmission module 430 when the written data pass verification.

In one embodiment, the command transmission module 430 includes a first register and a second register. The first register is configured for the first core 410 to send commands to the second core 420, and the second register is configured for the second core 420 to send commands to the first core 410.

In one embodiment, the first core 410 belongs to a first processor and the second core 420 belongs to a second processor. The memory 421 is the corresponding memory of the second processor.

The present disclosure provides an inter-core data processing method. According to the present disclosure, firstly the first core and the second core may exchange commands through the command transmission module such that the second core may acquire the mutex lock, and then the data exchange operation may be performed through the bus module. Therefore, when the first core is performing the data processing operation on the target address, the second core will not perform any operation to the same target address. The implementation of the present disclosure may avoid data errors and thus improve the stability of data operations.

It should be noted, SOC related embodiments of the present disclosure are corresponding to method related embodiments of the present disclosure as described above. Detailed principles and functions of the system on chip may refer to contents described in foregoing method related embodiments, and will not be repeated herein.

An electronic device according to an embodiment of the present disclosure is introduced below with reference to FIG. 7.

Figure 7:
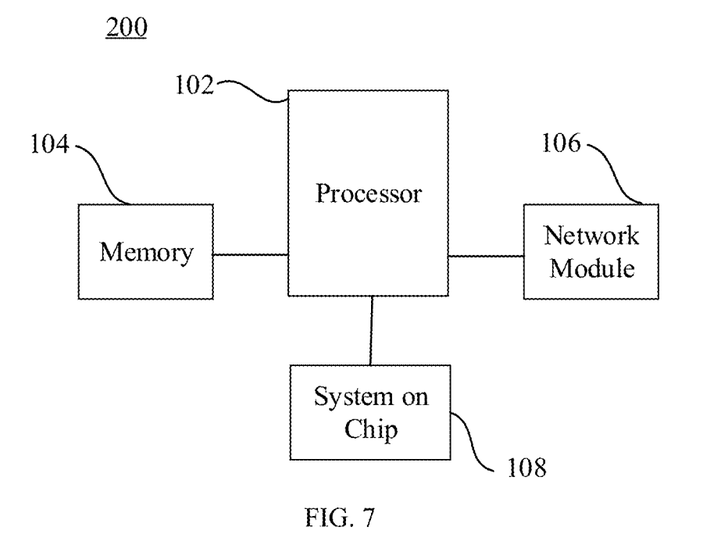
FIG. 7 is a schematic diagram of an electronic device for performing an inter-core data processing method according to an embodiment of the present disclosure.

Referring to FIG. 7, based on the above-mentioned inter-core data processing method, embodiments of the present disclosure further provide an electronic device 200 which is capable of performing the foregoing inter-core data processing method. The electronic device 200 include a processor 102, a memory 104, a network module 106 and a system on chip (SOC) 108. The memory 104 is configured to store programs which are capable of performing the foregoing methods. The internal structure of the SOC 108 may be similar to that shown in FIG. 1. It should be noted, the memory of the SOC 108 may not be the memory 104.

The processor 102 can include one or more processing cores, in which a certain core may be the first core of the embodiments as described above. The core(s) in the processor 102 may send a first command to the second core through the command transmission module, and the first command indicates that the first core is ready to perform the data processing operation corresponding to the target address which is located in the corresponding memory of the second core. The core(s) in the processor 102 may also perform the data processing operation corresponding to the target address through the bus module in response to the second command. The processor 102 is coupled to various components of the electronic device 100 via various interfaces and lines, and perform various functions and processing data of the electronic device 200 by executing or running instructions, programs, sets of code and sets of instructions stored in the memory 104, and by invoking data stored in the memory 104. Alternatively, the processor 102 may be selected from at least one of a digital signal processing (DSP), a field-programmable gate array (FPGA), and a programmable logic array (PLA). The processor 102 can integrate one or a combination of any of a central processing unit (CPU), a graphics processing unit (GPU), a modem, and the like. The CPU mainly deals with the operating system, user interface and applications, etc.; and the GPU is responsible for rendering and rendering of the display content. The modem is used to supply a wireless communication. It can be understood that the above modem may also be integrated into the processor 102 and implemented by a single communication chip.

The memory 104 may include a random-access memory (RAM), and may also include a read-only memory. Memory 104 can be used to store instructions, programs, code, code sets, or sets of instructions. The memory 104 may include a program storage area and a data storage area. The program storage area may store instructions for implementing an operating system, instructions for implementing at least one function (such as a touch function, a sound playing function, an image playing function, etc.), instructions for implementing the above-mentioned method embodiments, and the like. The storage data area can also store data (such as phone book, audio and video data, chat record data) created by the electronic device 100 in use.

The network module 106 is configured to receive and transmit electromagnetic waves, and perform a mutual conversion between electromagnetic waves and electrical signals. Thereby communicating with a communication network or other devices, for example, communicating with wireless access points, may be achieved. The network module 106 can include various circuit elements for performing these functions above, such as an antenna, a radio frequency transceiver, a digital signal processor, an encryption/decryption chip, a Subscriber Identity Module (SIM) card, a memory, etc. The network module 106 can communicate with various networks such as the Internet, an intranet, a wireless network, or communicate with other devices via a wireless network. The wireless network described above may include a cellular telephone network, a wireless local area network, or a metropolitan area network.

The SOC 108 may be an entire system integrated on a single chip, where all or some of the essential electronic circuits are packaged. A so called entire system generally includes a Central Processing Unit (CPU), a memory, and auxiliary circuits. The SOC technology is generally utilized in small-size but complex user electronic devices. For example, a SOC for sound detection may provide all necessary components such as audio receiver, analog-to-digital converter (ADC), microprocessor, necessary memory and input-output logic control components to users. Furthermore, a SOC may be implemented in single-chip wireless communication products (e.g., BLUETOOTH devices) to support single-chip WLAN function and cellular communication function.

Figure 8:
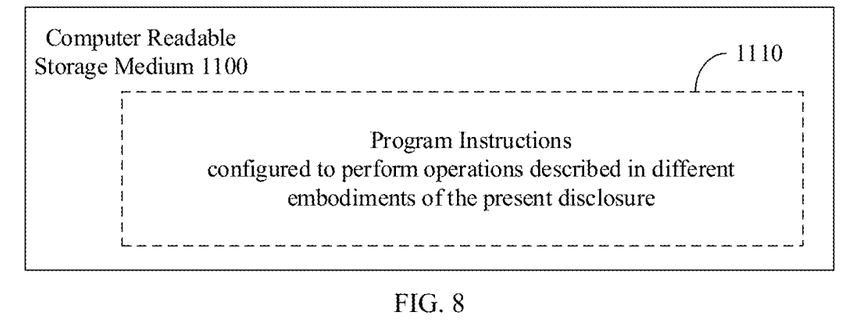
FIG. 8 is a schematic diagram of a computer readable storage medium according to an embodiment of the present disclosure.

FIG. 8 illustrates a schematic diagram of a computer readable storage medium according to an embodiment of the present disclosure. The computer readable storage medium 1100 is configured to store program instructions, which are configured to, when being executed by a processor, perform the method described in any one of the foregoing embodiments.

The computer readable storage medium 1100 can be an electronic memory such as a flash memory, an EEPROM (Electrically Erasable Programmable Read Only Memory), an EPROM, a hard disk, or an ROM. Alternatively, the computer readable storage medium 1100 includes a non-transitory computer-readable storage medium. The computer readable storage medium 1100 has a storage space for program code 810 that performs any of the operations of the methods described above. The program code can be read from or written to one or more computer program products. Program code 810 can be compressed, for example, in a suitable form.

The present disclosure provides an inter-core data processing method, a system, a system on chip, and an electronic device. With a command transmission module and a bus module, a first core may, when ready to perform a data processing operation corresponding to a target address, firstly send a first command to a second core. When receiving the first command, the second core may acquire a mutex lock corresponding to the target address in response to the first command, wherein the second core does not perform any operation on the target address in the duration of the mutex lock. Then the second core may return a second command to the first core through the command transmission module, and the second command is configured to inform the first core to start data processing. The first core may perform the corresponding data processing operation on the target address through the bus module in response to the second command. According to the present disclosure, firstly the first core and the second core may exchange commands through the command transmission module such that the second core may acquire the mutex lock, and then the data exchange operation may be performed through the bus module. Therefore, when the first core is performing the data processing operation on the target address, the second core will not perform any operation to the same target address. The implementation of the present disclosure may avoid data errors and thus improve the stability of data operations.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. An inter-core data processing method, configured to be implemented in an electronic device which at least comprises a first core, a second core, a command transmission module and a bus module, wherein the method comprises:
   the first core sending a first command to the second core through the command transmission module, wherein the first command indicates that the first core is ready to perform a data processing operation corresponding to a target address, wherein the target address is located in a corresponding memory of the second core;
   the second core acquiring a mutex lock of the target address in response to the first command;
   the second core returning a second command to the first core through the command transmission module, wherein the second command is configured to inform the first core to start the data processing operation; and
   the first core performing the data processing operation corresponding to the target address through the bus module in response to the second command;
   wherein before the operation of the first core sending the first command to the second core through the command transmission module, the first core generates a start tag which indicates that the first core is ready to perform the data processing operation; and
   wherein after the operation of the first core performing the data processing operation corresponding to the target address through the bus module in response to the second command, the first core generates an end tag which indicates that the first core has completed the data processing operation.

2. The method of claim 1, further comprising:
   before the operation of the first core generating the end tag, the first core sending a data processing accomplishment command to the second core through the command transmission module;
   wherein the operation of the first core generating the end tag comprises:
      the first core generating the end tag in response to receiving a responding command corresponding to the data processing accomplishment command, wherein the responding command is sent by the second core through the command transmission module.

3. The method of claim 2, wherein the data processing operation comprises a data reading operation, wherein before the operation of the first core sending the data processing accomplishment command to the second core through the command transmission module, the method further comprises:
   the first core verifying read data; and
   the first core performing, in response to the read data passing the verification, the operation of sending the data processing accomplishment command to the second core.

4. The method of claim 2, wherein the data processing operation comprises a data writing operation, wherein before the operation of the first core generating the end tag, the method further comprises:
   the second core verifying written data; and
   the second core performing, in response to the written data passing the verification, an operation of the second core sending the responding command corresponding to the data processing accomplishment command to the first core through the command transmission module.

5. The method of claim 1, wherein the operation of the second core acquiring the mutex lock of the target address in response to the first command comprises:
   under a condition that a priority level of the data processing operation indicated by the first command is higher than a priority level of a data reading-writing operation currently performed by the second core, the second core acquiring the mutex lock of the target address in response to the first command.

6. The method of claim 1, wherein the operation of the second core acquiring the mutex lock of the target address in response to the first command comprises:
   under a condition that a priority level of the data processing operation indicated by the first command is not higher than a priority level of a data reading-writing operation currently performed by the second core, the second core acquiring, in response to the first command, the mutex lock of the target address after the current data reading-writing operation is completed.

7. The method of claim 1, wherein the command transmission module comprises a first register and a second register;
wherein the first register is configured for registering one or more commands sent by the first core to the second core; and
wherein the second register is configured for registering one or more command sent by the second core to the first core.

8. The method of claim 1, wherein the first core is integrated in a first chip, the second core and the corresponding memory are integrated in a second chip different from the first chip.

9. A system on chip, at least comprising a second core, a command transmission module and a bus module; wherein the second core is configured to:
receive a first command sent by a first core through the command transmission module, wherein the first command indicates that the first core is ready to perform a data processing operation corresponding to a target address, wherein before the first core sends the first command to the second core through the command transmission module, a start tag is generated by the first core, and the start tag indicates that the first core is ready to perform the data processing operation;
acquire a mutex lock of the target address in response to receiving the first command; and
return a second command to the first core through the command transmission module to trigger the first core to perform the data processing operation corresponding to the target address in response to the second command through the bus module, wherein after the first core performs the data processing operation corresponding to the target address through the bus module in response to the second command, an end tag is generated, and the end tag indicates that the first core has completed the data processing operation.

10. The system on chip of claim 9, further comprising a memory, the target address being stored in the memory.

11. The system on chip of claim 9, wherein the second core is further configured to:
receive a data processing accomplishment command through the command transmission module, wherein the data processing accomplishment command is sent by the first core before generating the end tag; and
send a responding command corresponding to the data processing accomplishment command to the first core through the command transmission module, wherein the end tag is generated by the first core in response to receiving the responding command.

12. The system on chip of claim 11, wherein the data processing operation comprises a data writing operation, and the second core is further configured to:
before the first core generates the end tag, verify written data, and perform, in response to the written data passing the verification, an operation of the second core sending the responding command corresponding to the data processing accomplishment command to the first core through the command transmission module.

13. An electronic device, at least comprising a first core and a system on chip, wherein the system on chip comprises a second core, a command transmission module and a bus module;
wherein the first core is configured to send a first command to the second core through the command transmission module, wherein the first command indicates that the first core is ready to perform a data processing operation corresponding to a target address, wherein the target address is located in a corresponding memory of the second core;
wherein the second core is configured to acquire a mutex lock corresponding to the target address in response to the first command, and to return a second command to the first core through the command transmission module;
wherein the first core is configured to perform the data processing operation corresponding to the target address through the bus module in response to the second command;
wherein the first core is further configured to, before sending the first command to the second core through the command transmission module, generate a start tag which indicates that the first core is ready to perform the data processing operation; and
wherein the first core is further configured to, after performing the data processing operation corresponding to the target address through the bus module in response to the second command, generate an end tag which indicates that the first core has completed the data processing operation.

14. The electronic device of claim 13, wherein the first core is further configured to, before generating the end tag, send a data processing accomplishment command to the second core through the command transmission module; and
wherein the first core is further configured to generate the end tag in response to receiving a responding command corresponding to the data processing accomplishment command, the responding command being sent by the second core through the command transmission module.

15. The electronic device of claim 14, wherein the data processing operation comprises a data reading operation,
wherein the first core is further configured to, before sending the data processing accomplishment command to the second core through the command transmission module, verify read data, and perform, in response to the read data passing the verification, the operation of sending the data processing accomplishment command to the second core.

16. The electronic device of claim 14, wherein the data processing operation comprises a data writing operation,
wherein the second core is further configured to, before the first core generates the end tag, verify written data, and perform, in response to the written data passing the verification, an operation of the second core sending the responding command corresponding to the data processing accomplishment command to the first core through the command transmission module.

17. The electronic device of claim 13, wherein the second core is configured to, under a condition that a priority level of the data processing operation indicated by the first command is higher than a priority level of a data reading-writing operation currently performed by the second core, acquire the mutex lock of the target address in response to the first command.

18. The electronic device of claim 13, wherein the second core is configured to, under a condition that a priority level of the data processing operation indicated by the first command is equal to or lower than a priority level of a data reading-writing operation currently performed by the second core, acquire, in response to the first command, the mutex lock of the target address after the current data reading-writing operation is completed.

19. The electronic device of claim 13, wherein the command transmission module comprises a first register and a second register;
   wherein the first register is configured for registering one or more commands sent by the first core to the second core; and
   wherein the second register is configured for registering one or more command sent by the second core to the first core.

20. The electronic device of claim 13, wherein the first core is integrated in a first chip, the second core and the corresponding memory are integrated in a second chip different from the first chip.

* * * * *